United States Patent
Cao et al.

(10) Patent No.: US 6,310,690 B1
(45) Date of Patent: Oct. 30, 2001

(54) DENSE WAVELENGTH DIVISION MULTIPLEXER UTILIZING AN ASYMMETRIC PASS BAND INTERFEROMETER

(75) Inventors: Simon X. F. Cao, San Mateo, CA (US); Xiaoping Mao, Plano, TX (US)

(73) Assignee: Avanex Corporation, Fremont, CA (US)

(*) Notice: Subject to any disclaimer, the term of this patent is extended or adjusted under 35 U.S.C. 154(b) by 0 days.

(21) Appl. No.: 09/388,350

(22) Filed: Sep. 1, 1999

Related U.S. Application Data

(63) Continuation of application No. 09/247,253, filed on Feb. 10, 1999, now Pat. No. 6,169,604.

(51) Int. Cl.⁷ .................................................. G01B 9/02
(52) U.S. Cl. ........................................ 356/519; 359/127
(58) Field of Search ................................ 356/519, 352, 356/477, 480; 385/24; 359/127, 124, 582

(56) References Cited

U.S. PATENT DOCUMENTS 6,130,971    10/2000   Cao .
6,169,604  * 1/2001   Cao ........................................ 356/519

* cited by examiner

Primary Examiner—Frank G. Font
Assistant Examiner—Phil Natividad
(74) Attorney, Agent, or Firm—Sawyer Law Group LLP

(57) ABSTRACT

The present invention provides an improvement in the separation mechanism to be used in a dense wavelength division multiplexer. The separation mechanism in accordance with the present invention includes an asymmetric pass band interferometer. The interferometer includes a first glass plate optically coupled to a second glass plate, forming a space therebetween; a first reflective coating with a first reflectivity residing inside the space and on the first glass plate; a second reflective coating with a second reflectivity residing inside the space and on the second glass plate; a first waveplate with a first optical retardance residing inside the space; and a second waveplate with a second optical retardance, optically coupled to the first glass plate and residing outside the space, where a combination of values for the first reflectivity, the first optical retardance, and the second optical retardance effect a separation of channels in at least one optical signal into at least two sets, and where the at least two sets have asymmetrically interleaved pass bands. The asymmetric pass band interferometer in accordance with the present invention is capable of separating channels from signals with different data transfer rates. With the present invention, a maximum use of available bandwidth on an optical fiber may be accomplished. An added functionality of the asymmetric pass band interferometer of the present invention is the ability to facilitate an asymmetric or uneven add/drop function while also separating the channels.

26 Claims, 16 Drawing Sheets

1000

DENSE WAVELENGTH DIVISION MULTIPLEXER UTILIZING AN ASYMMETRIC PASS BAND INTERFEROMETER

RELATED PATENT APPLICATIONS

This application is a continuation-in-part of U.S. Patent Application entitled "Nonlinear Interferometer For Fiber Optic Dense Wavelength Division Multiplexer Utilizing A Phase Differential Method Of Wavelength Separation", Ser. No. 09/247,253, filed Feb. 10, 1999, now U.S. Pat. No. 6,169,604.

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed and high data capacity capabilities. Multiple wavelengths may be transmitted along the same optic fiber. This totality of multiple combined wavelengths comprises a single transmitted composite signal. A crucial feature of a fiber optic network is the separation of the optical signal into its component channels, typically by a wavelength division multiplexer. This separation must occur in order for the exchange of channels between signals on "loops" within networks to occur. The exchange occurs at connector points, or points where two or more loops intersect for the purpose of exchanging channels.

Add/drop systems exist at the connector points for the management of the channel exchanges. The exchanging of data involves the exchanging of matching channels from two different loops within an optical network. In other words, each signal drops a channel to the other loop while simultaneously adding the matching channel from the other loop.

FIG. 1 illustrates a simplified optical network 100. A fiber optic network 100 could comprise a main loop 150 which connects primary locations, such as San Francisco and New York. In-between the primary locations is a local loop 110 which connects with loop 150 at connector point 140. Thus, if local loop 110 is Sacramento, channels at San Francisco are multiplexed into an optical signal which will travel from San Francisco, add and drop channels with Sacramento's signal at connector point 140, and the new signal will travel forward to New York. Within loop 110, optical signals would be transmitted to various locations within its loop, servicing the Sacramento area. Local receivers (not shown) would reside at various points within the local loop 110 to convert the optical signals into the electrical signals in the appropriate protocol format.

The separation of an optical signal in the composite signal into its component channels is typically performed by a dense wavelength division multiplexer. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new optical signal by the dense wavelength division multiplexer 230. The new signal is then returned to Loop 150 via node D (290). At the same time, $\lambda_1'$ is transferred from path 280-1 to path 250-1. It is combined with the others of Loop 110's channels into a single optical signal by the dense wavelength division multiplexer 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. The opposite is true from Loop 150's frame of reference. This is the add/drop function.

Conventional methods used by wavelength division multiplexers in separating an optical signal into its component channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here.

A problem with the conventional separators is their limitation to channels with identical spacings and/or bandwidths. However, networks typically transmit multiple signals with different modulations or data transfer rates. These different modulation rates lead to different effective bandwidths, which are herein referred to an information bandwidths. For instance, greater modulation rates are associated with occupation or utilization of greater optical bandwidth (defined either in frequency or in wavelength) than are slower modulation rates. However, optical components within conventional wavelength division multiplexed (WDM) optical communications systems are associated with certain fixed channel band pass widths. In WDM systems in which different signals are transmitted at different data transfer rates along different channels, the available fiber bandwidth can be utilized most efficiently when hardware bandwidths match the information bandwidths dictated by the channel data transfer rates. This requires optical hardware with uneven or asymmetric channel pass bands. Conventional channel separators have fixed channel bandwidths and are not able to separate channels in such an asymmetric fashion. Thus, in conventional WDM systems, either the pass bands must be made as wide as the widest information bandwidth or else the information bandwidth on each channel is restricted to the available hardware band pass. In either case, this can lead to inefficient use of overall optical system bandwidth.

Accordingly, there exists a need for an optical channel separation mechanism which would allow a wavelength division multiplexer to separate channels in an asymmetric fashion. The mechanism should allow the hardware band pass to correlate with the channel information bandwidth, and allow more efficient use of optical bandwidth in WDM systems in which signals with different data transfer rates propagate simultaneously. The present invention addresses such a need.

SUMMARY OF THE INVENTION

The present invention provides an improvement in the separation mechanism to be used in a dense wavelength division multiplexer. The separation mechanism in accordance with the present invention includes an asymmetric pass band interferometer. The interferometer includes a first glass plate optically coupled to a second glass plate, forming a space therebetween; a first reflective coating with a first reflectivity residing inside the space and on the first glass plate; a second reflective coating with a second reflectivity residing inside the space and on the second glass plate; a first waveplate with a first optical retardance residing inside the space; and a second waveplate with a second optical retardance, optically coupled to the first glass plate and residing outside the space, where a combination of values for the first reflectivity, the first optical retardance, and the second optical retardance effect a separation of channels in at least one optical signal into at least two sets, and where the at least two sets have asymmetrically interleaved pass bands. The asymmetric pass band interferometer in accordance with the present invention is capable of separating channels from signals with different data transfer rates. With the present invention, a maximum use of available bandwidth on an optical fiber may be accomplished. An added functionality of the asymmetric pass band interferometer of the present invention is the ability to facilitate an asymmetric or uneven add/drop function while also separating the channels.

DETAILED DESCRIPTION

The present invention relates to an improvement in the separation mechanism to be used in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The separation mechanism to be used within a separator of a dense wavelength division multiplexer (DWDM) in accordance with the present invention comprises an asymmetric pass band interferometer. As used in this specification, an "asymmetric pass band interferometer" is an optical interferometric device which, with a changing wavelength or frequency of light interacting with the device, produces a periodic asymmetric modulation of some physical property of the light after the interaction. This interferometer would allow a DWDM to separate channels from signals with different bandwidths and would thereby facilitate efficient bandwidth utilization in WDM systems in which different signals are transmitted at different transfer rates along different channels.

To more particularly describe the features of the present invention, please refer to FIGS. 3 through 15 in conjunction with the discussion below.

Figure 1:
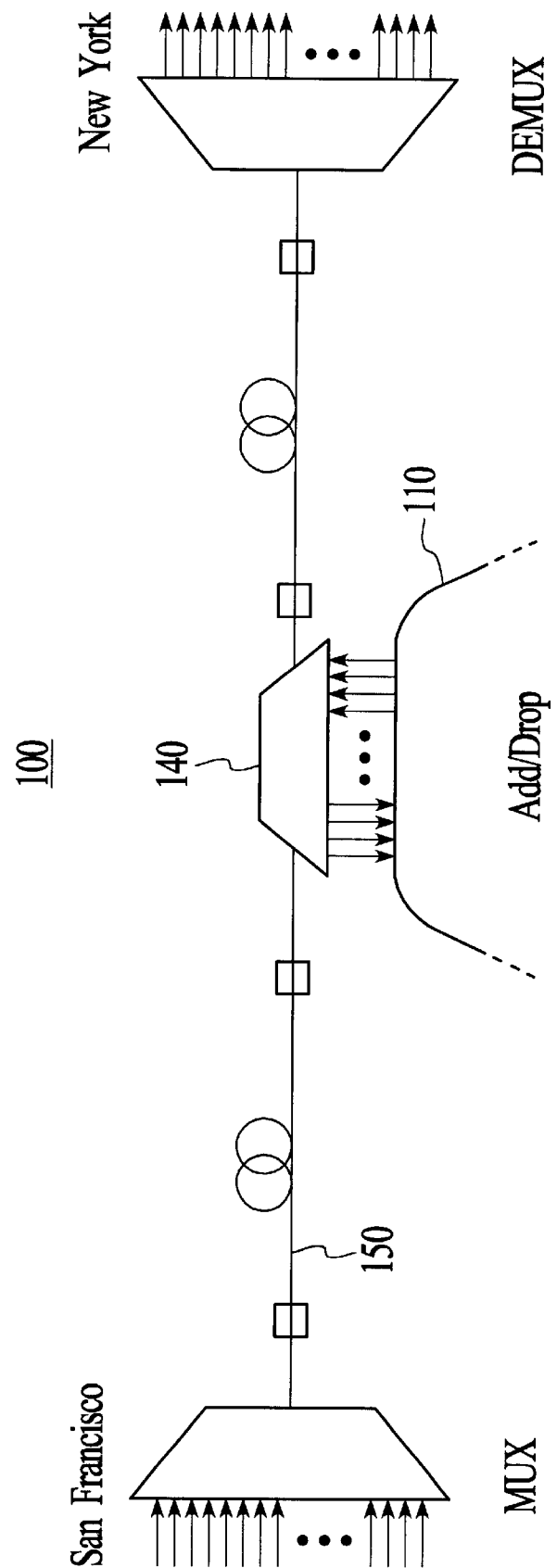
FIG. 1 is an illustration of a simplified optical network.
Figure 2:
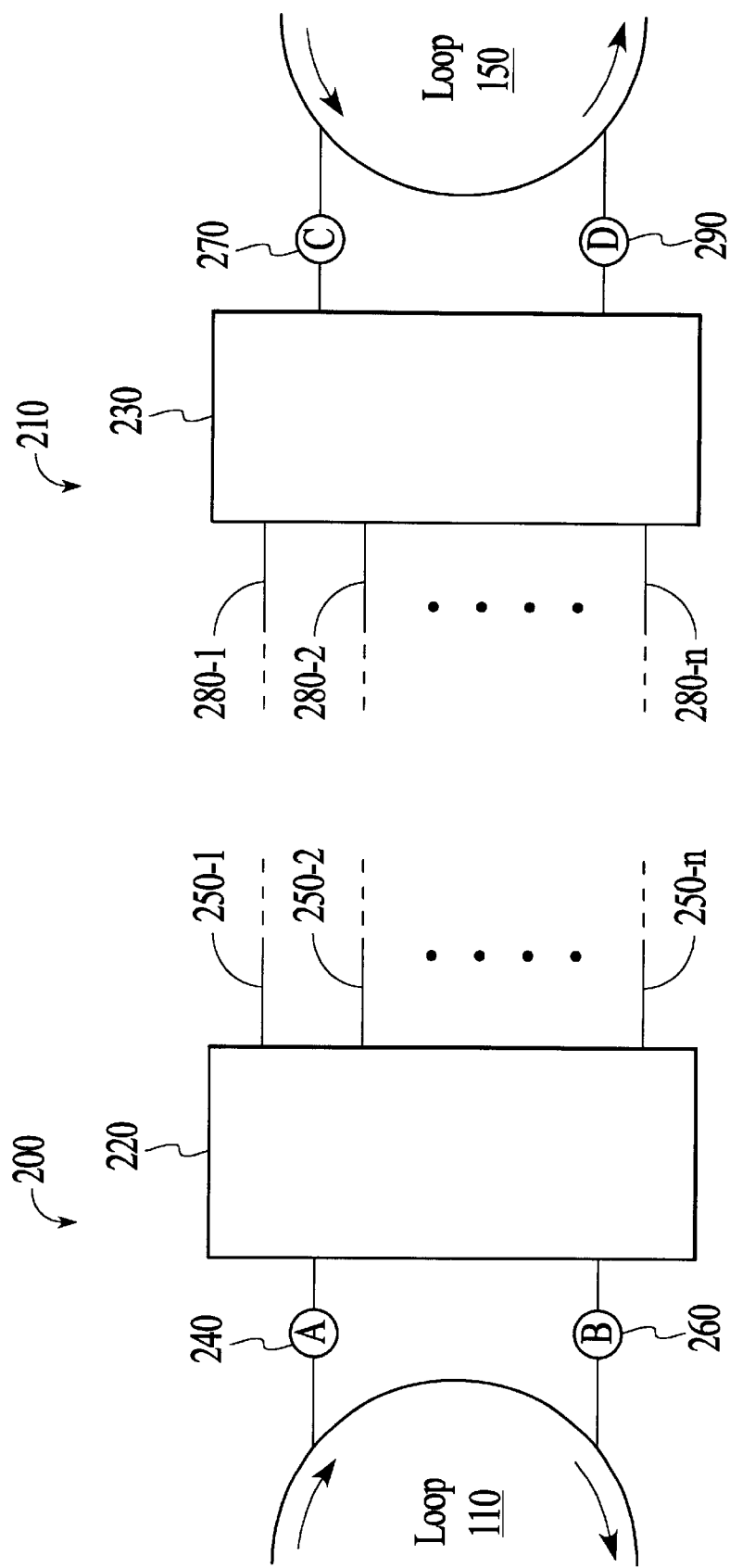
FIG. 2 is an illustration of conventional add/drop systems and dense wavelength division multiplexers.
Figure 3:
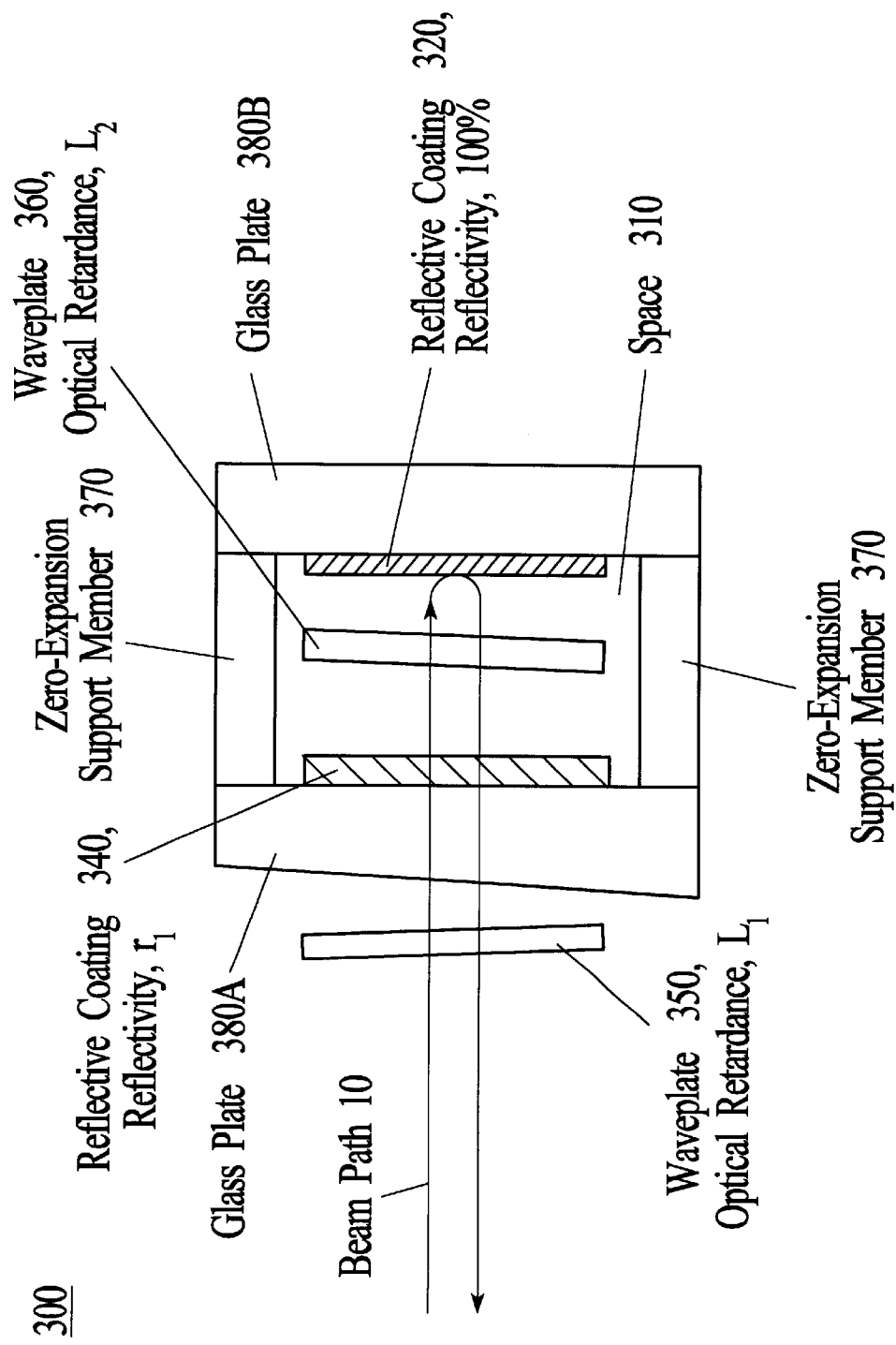
FIG. 3 illustrates a preferred embodiment of an asymmetric pass band interference in accordance with the present invention.

FIG. 3 illustrates a preferred embodiment of an asymmetric pass band interferometer in accordance with the present invention. The interferometer 300 would reside within a separator in a DWDM. The interferometer 300 comprises two glass plates 380A–380B, creating a space 310 therebetween. The inside face of the glass plate 380B is coated with a reflective coating 320 with a reflectivity $r_2$ preferably of 100%. The inside face of the glass plate 380A is coated with a reflective coating 340 with a reflectivity value, $r_1$. A first waveplate 350 outside the space 310 and a second waveplate 360 inside the space 310 introduce a phase change between an o beam and e beam of the signal 10 outside and inside the space 310. The waveplate 350 effectuates an optical retardance value $L_1$ while waveplate 360 effectuates an optical retardance value $L_2$. The two glass plates 380A and 380B are separated by zero-expansion support members 370. The zero expansion support members 370 are composed of a temperature insensitive material so they do not significantly expand/contract with changes in temperature. Two examples of suitable materials for zero-expansion support member 370 include ULE glass manufactured by CORNING, INC. of Corning, N.Y., USA, and ZERODUR glass manufactured by SCHOTT GLASS, TECHNOLOGIES of Duryea Pa., USA.

Figure 4:
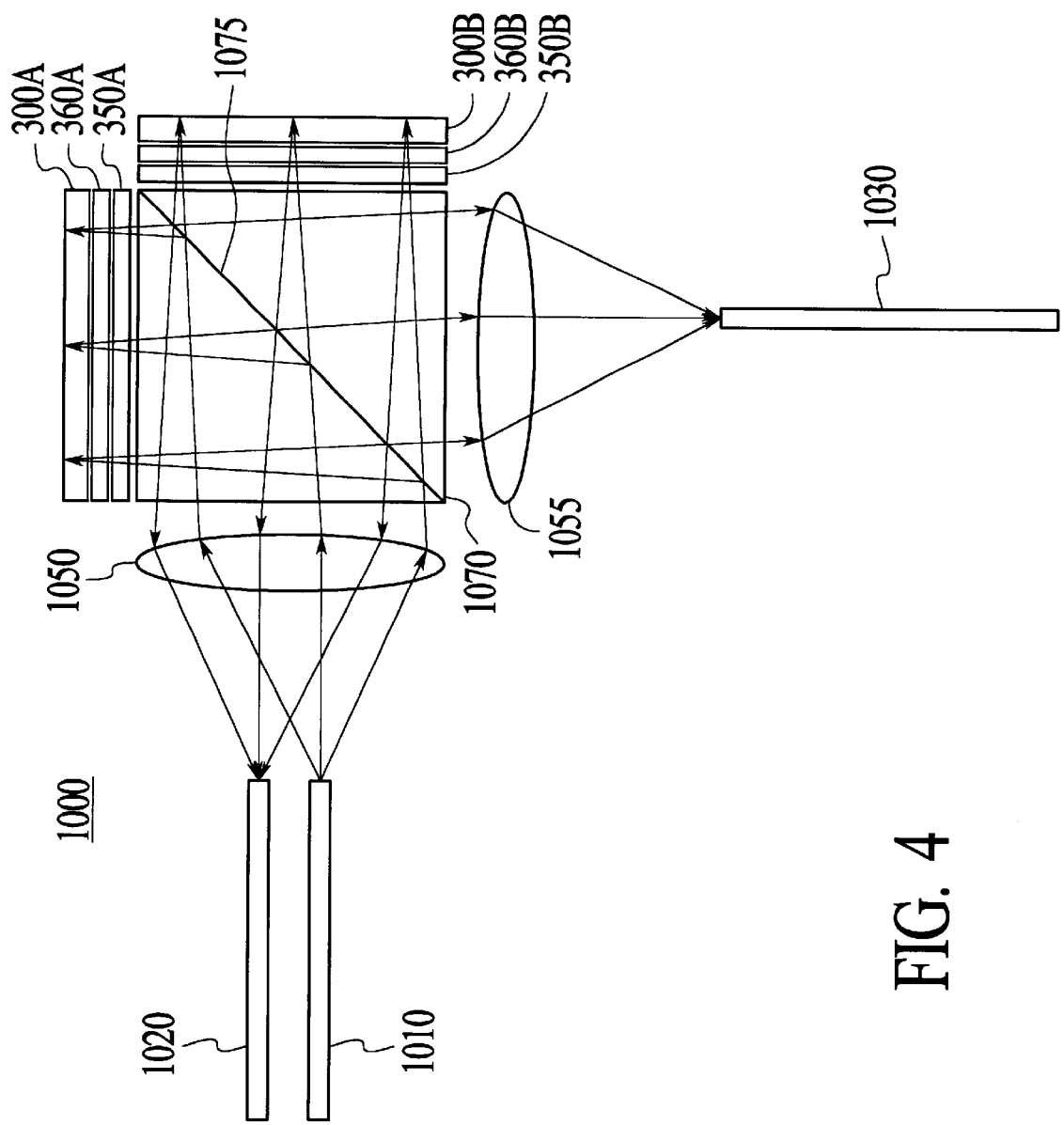
FIG. 4 illustrates a top view of a first preferred embodiment of a separator which may be used with the preferred embodiment of the interferometer in accordance with the present invention.

FIG. 4 illustrates a top view of a first preferred embodiment of a separator which may be used with the preferred embodiment of the interferometer in accordance with the present invention. This separator is disclosed in co-pending U.S. Patent Application entitled "Nonlinear Interferometer For Fiber Optic Dense Wavelength Division Multiplexer Utilizing A Phase Differential Method of Wavelength Separation,", Ser. No. 09/247,253, filed Feb. 10, 1999. Applicant hereby incorporates this Patent Application by reference.

The separator 1000 comprises an optical fiber 1010 for inputting optical signals and optical fibers 1020 and 1030 for outputting optical signals. As the signals leave the optic fiber 1010, they diverge. A lens 1050 contains the signals and direct them toward a polarization beam splitter 1070 which decomposes the signals based upon their polarization plane orientations. This decomposition takes place at a junction plane 1075 of the beam splitter 1070. The component (p-component) of the input signals polarized within the plane defined by the input signals' direction of travel and a line perpendicular to junction plane 1075 passes through beam splitter 1070 towards an asymmetric pass band interferometer 300B. The component (s-component) of the input signals polarized parallel to junction plane 1075 is reflected by beam splitter 1070 towards an asymmetric pass band interferometer 300A. The interferometers 300A and 300B introduce phase differences between two sets of channels transmitted via the input signals.

Figure 5:
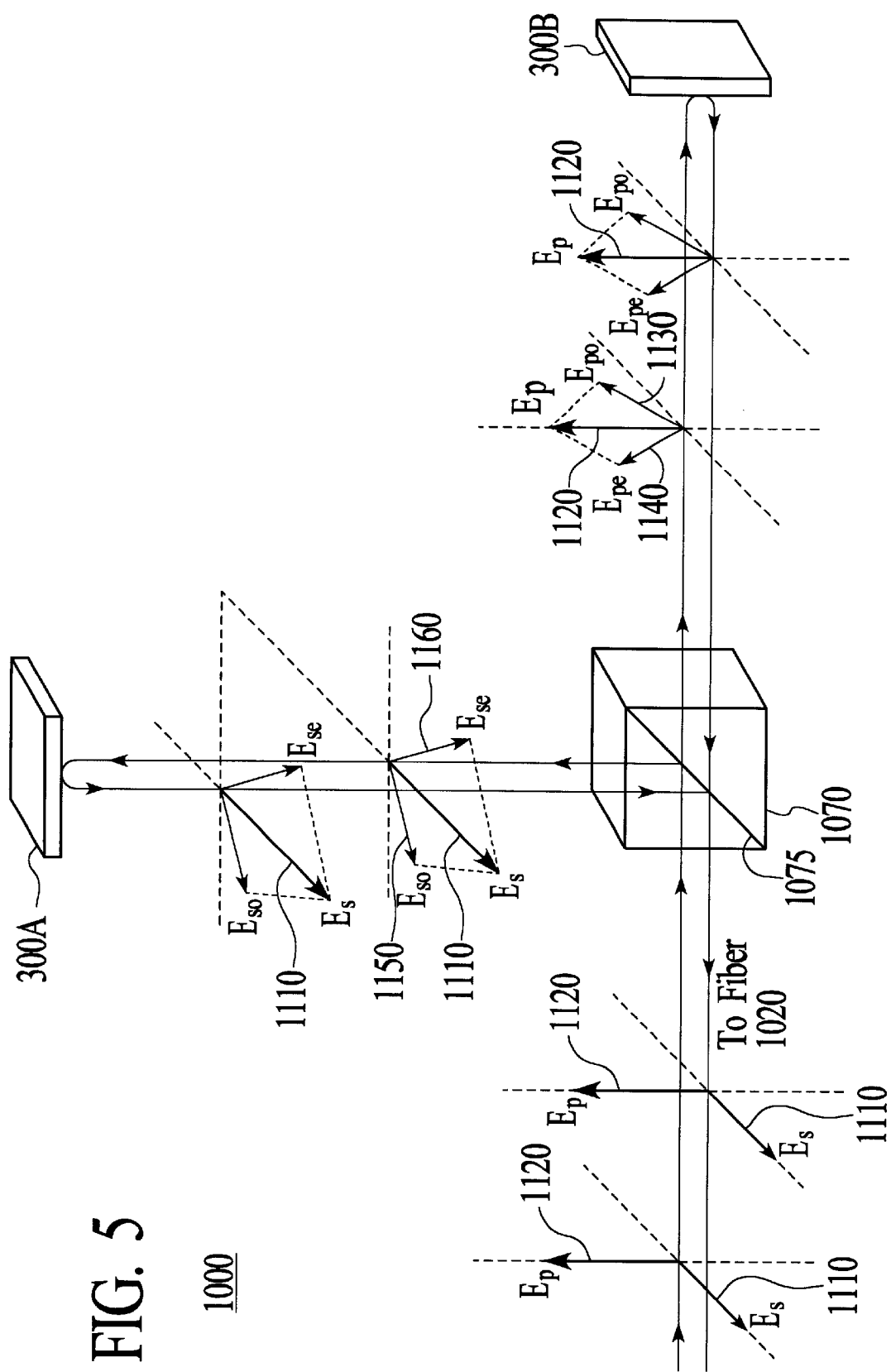
FIG. 5 illustrates the path of a set of channels as they travel through the separator with the asymmetric pass band interferometers in accordance with the present invention.

FIG. 5 illustrates the path of one set of channels of the input signals as they travel through the separator 1000 with the asymmetric pass band interferometers 300A and 300B in accordance with the present invention. This set of channels travels to the polarization beam splitter 1070 from the input fiber 1010. Each channel has an s polarity component ($E_s$) light 1110 and a p polarity component ($E_p$) light 1120. The $E_s$ and $E_p$ polarity component lights may each be decomposed into $E_o$ and $E_e$ components parallel to the principal ray directions of the birefringent elements in interferometer 300B and 300A, respectively. These components are well known in the art and will not further be described here. The vector $E_p$ 1120 is decomposed into components $E_{po}$ 1130 and $E_{pe}$ 1140 whereas the vector $E_s$ 1110 is decomposed into components $E_{so}$ 1150 and $E_{se}$ 1160. This decomposition is illustrated in FIG. 5 for each of the component light represented by vectors $E_s$ and $E_p$ both before its entry into and after its exit from the interferometer 300A and 300B, respectively. The light whose polarization is represented by vector $E_p$ 1120 travels to the interferometer 300B while light whose polarization is represented by vector $E_s$ 1110 travels to interferometer 300A. Both such component lights are reflected by their interferometers 300A and 300B without a phase shift difference between $E_{so}$ 1150 and $E_{se}$ 1160 (or between $E_{po}$ 1130 and $E_{pe}$ 1140). Thus, both the $E_p$ 1120 and the $E_s$ 1110 component light travel back to the polarization beam splitter 1070 without a change in orientation. These components then travel back through the polarization beam splitter 1070 to output fiber 1020.

Figure 6:
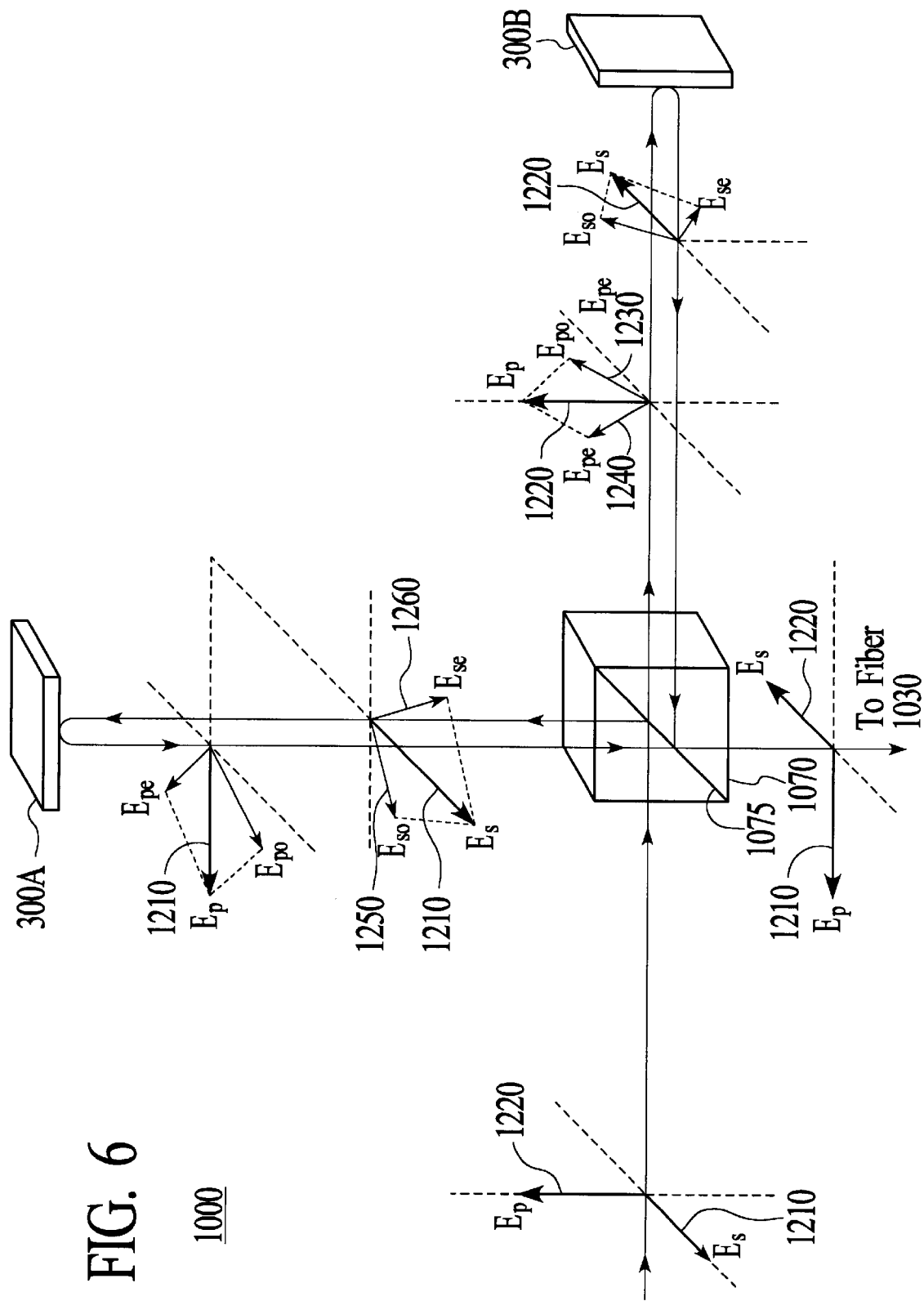
FIG. 6 illustrates the path of the remaining channels as they are introduced a phase change as they travel through the separator 1000 with the interferometer 400A and 400B in accordance with the present invention.

FIG. 6 illustrates the path of the remaining channels of the input signals as they are introduced a phase change as they travel through the separator 1000 with the interferometer 300A and 300B in accordance with the present invention. As with the set of channels illustrated in FIG. 5, the remaining channels travel to the polarization beam splitter 1070 from the input fiber 1010. Each channel has an s polarity component ($E_s$) light 1210 and a p polarity component ($E_p$) light 1220. As with the set of channels of FIG. 5, the $E_s$ and $E_p$ polarity component light may each be decomposed into $E_o$ and $E_e$ components parallel to the principal ray directions of the birefringent elements in interferometer 300A and 300B, respectively. The vector $E_p$ 1220 is decomposed into components $E_{po}$, 1230 and $E_{pe}$ 1240 whereas the vector $E_s$ 1210 is decomposed into components $E_{so}$ 1250 and $E_{se}$ 1260. This decomposition is illustrated in FIG. 6 for each of the component lights represented by vectors $E_s$ and $E_p$ both before its entry into and after its exit from the interferometer 300A and 300B, respectively. The light whose polarization is represented by vector $E_p$ 1220 travels to the interferometer 300B while the light whose polarization is represented by vector $E_s$ 1210 travels to interferometer 300A. For the remaining channels, interferometers 300A and 300B introduce a $\pi$ phase difference between $E_{po}$ 1230 and $E_{pe}$ 1240 and also between $E_{so}$ 1250 and $E_{se}$ 1260 respectively. This phase difference causes an effective $\pi/2$ rotation of the polarization of each of the component lights 1210 and 1220, thereby converting them from $E_s$ into $E_p$ and from $E_p$ into $E_s$, respectively. When both of these component lights travel through beam splitter 1070 again, this rotation causes them to travel to output fiber 1030. Thus, in this manner, output fiber 1020 contains the set of channels from FIG. 6 while output fiber 1030 contains the remaining channels.

The set of channels to be introduced a phase change are selected by adjusting the reflectivity value $r_1$ of the first reflective coating 340, the retardance value $L_1$ of the first waveplate 350, or the retardance value $L_2$ of the second waveplate 360, or any combination thereof, as demonstrated below.

Figure 7:
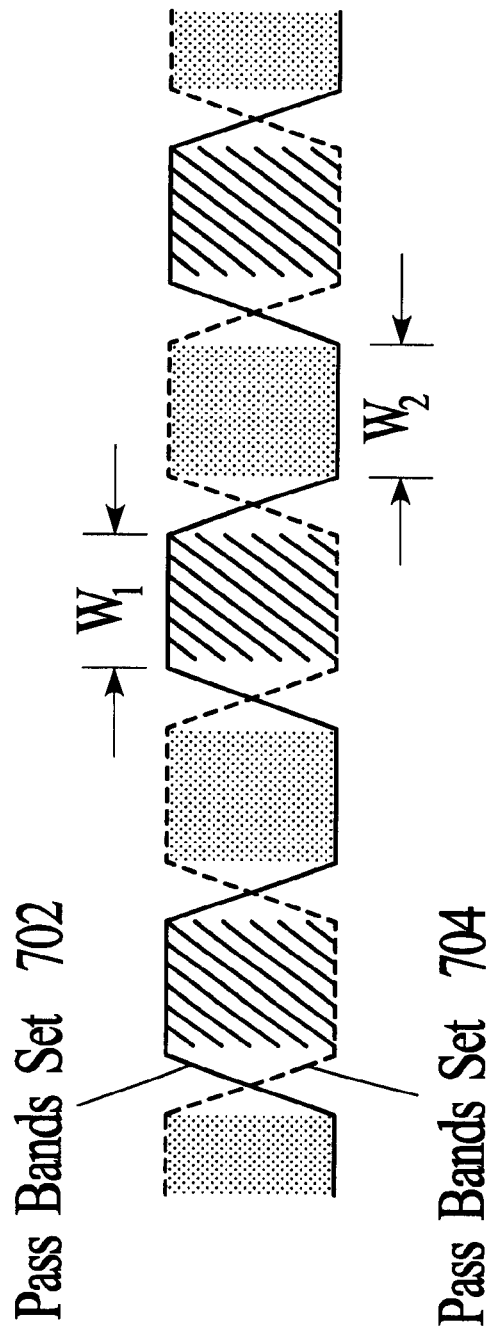
FIGS. 7, 8, and 9 illustrate examples of various pass bands facilitated by the interferometer in accordance with the preferred embodiment.
Figure 8:
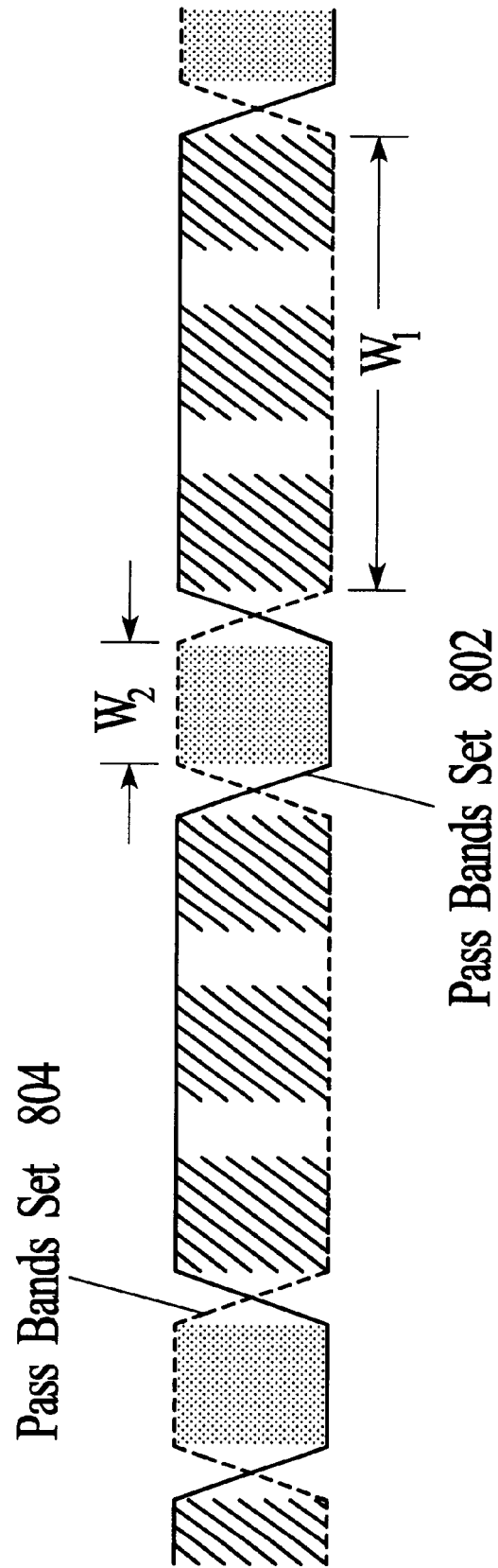
Figure 9:
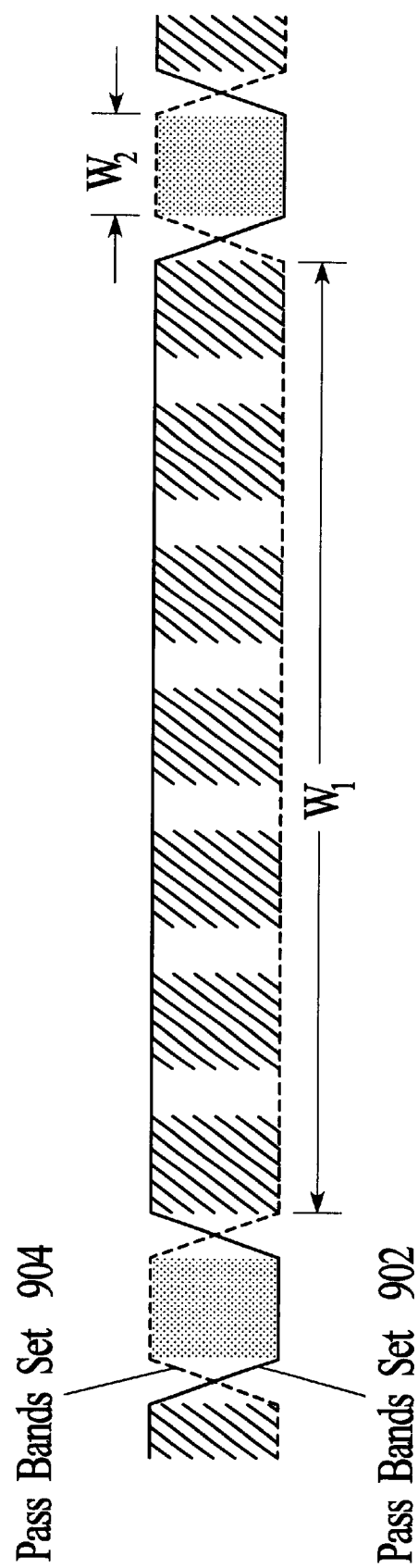

FIGS. 7, 8, and 9 illustrate examples of both symmetrically and asymmetrically interleaved pass bands whose separation is facilitated by the interferometer in accordance with the preferred embodiment. In each of these figures, the horizontal dimension schematically represents wavelength or frequency and the vertical dimension schematically represents optical transmittance between the input port and one or another of the output ports of a channel separator. For example, as illustrated in FIG. 7, the reflectivity value $r_1$ of the first reflective coating 340 is set at 18.5%, and the retardance values $L_1$ and $L_2$ for the first results in a pass band $w_1$ for a set 702 of channels and a pass band $w_2$ for a set 704 of the remaining channels, where the ratio of $w_1$ to $w_2$ is 1:1. In FIG. 7, the channel sets 702 and 704 are represented by solid and dashed lines, respectively. Thus, set 702 of every other channel would be directed to one output fiber, while set 704 of the remaining every other channel would be directed to another output fiber.

In this specification, the term "symmetrically interleaved" is used to describe channel pass band sets like those illustrated in FIG. 7, and the term "asymmetrically interleaved" is used to describe channel pass band sets like those illustrated in either FIG. 8 or FIG. 9. In symmetrically interleaved channel configurations (FIG. 7), a first set of channels is interleaved and multiplexed together with a second set of channels and the pass band widths of all channels are substantially equal to one another. In asymmetrically interleaved channel configurations (FIGS. 8, 9), the common pass band widths of a first set of channels are substantially different from the common pass band widths of a second set of channels interleaved and multiplexed together with the first set.

For a second example, as illustrated in FIG. 8, $r_1$ is set at 32.5%, and $L_1$ and $L_2$ are set at $3\lambda/16$ and $\lambda/8$, respectively. This set of values results in a $w_1$ to $w_2$ ratio of 3:1. Thus, set 802 of three channels would be directed to one output fiber, while set 804 of the remaining channels in-between each group of three channels in set 802 would be directed to another output fiber. The shaded regions in FIGS. 7–9 schematically illustrate the locations and bandwidths of conventional WDM channels having even spacings and identical channel pass band widths. In the example shown in FIG. 8, the channel set 802 comprises groups of three adjacent conventional channels separated from one anther by gaps having widths equivalent to that of one conventional channel. Also, in the example of FIG. 8, the channel set 804 comprises every fourth conventional channel wherein such channels coincide with the gaps of channel set 802. However, the invention is not intended to be limited to channels with conventional band widths and channel set 802 could alternatively comprise a set of channels whose pass bands are three times wider than their isolation bands. Such would be the case, for instance, wherein channel set 802 and 804 comprise relatively high-speed and low-speed digital signals, respectively.

For a third example, as illustrated in FIG. 9, $r_1$ is set at 56.3%, and $L_1$ and $L_2$ are set at $7\lambda/32$ and $\lambda/16$, respectively. This set of values results in a $w_1$ to $w_2$ ratio of 7:1. Thus, set 902 of either seven adjacent conventional channels or else a single channel whose bandwidth is seven times greater than that of a conventional channel would be directed to one output fiber, while set 904 of the remaining channels in-between each group of seven conventional channels of set 902 would be directed to another output fiber.

Therefore, by varying $r_1$, $L_1$, and $L_2$ in different combinations, different sets of channels or channels with different bandwidths may be separated by the separator in accordance with the present invention. The above-described device is particularly useful when different signals with different data transfer rates are simultaneously transmitted through the same optical fiber. One signal may have a lower modulation rate than the other. The different data transfer rates may be the result of signals being transmitted from different sources. With the device in accordance with the present invention, a maximum use of available bandwidth on an optical fiber may be accomplished since the channels transmitted via signals with different data transfer rates, but on the same fiber, may be successfully separated from each other.

Figure 10:
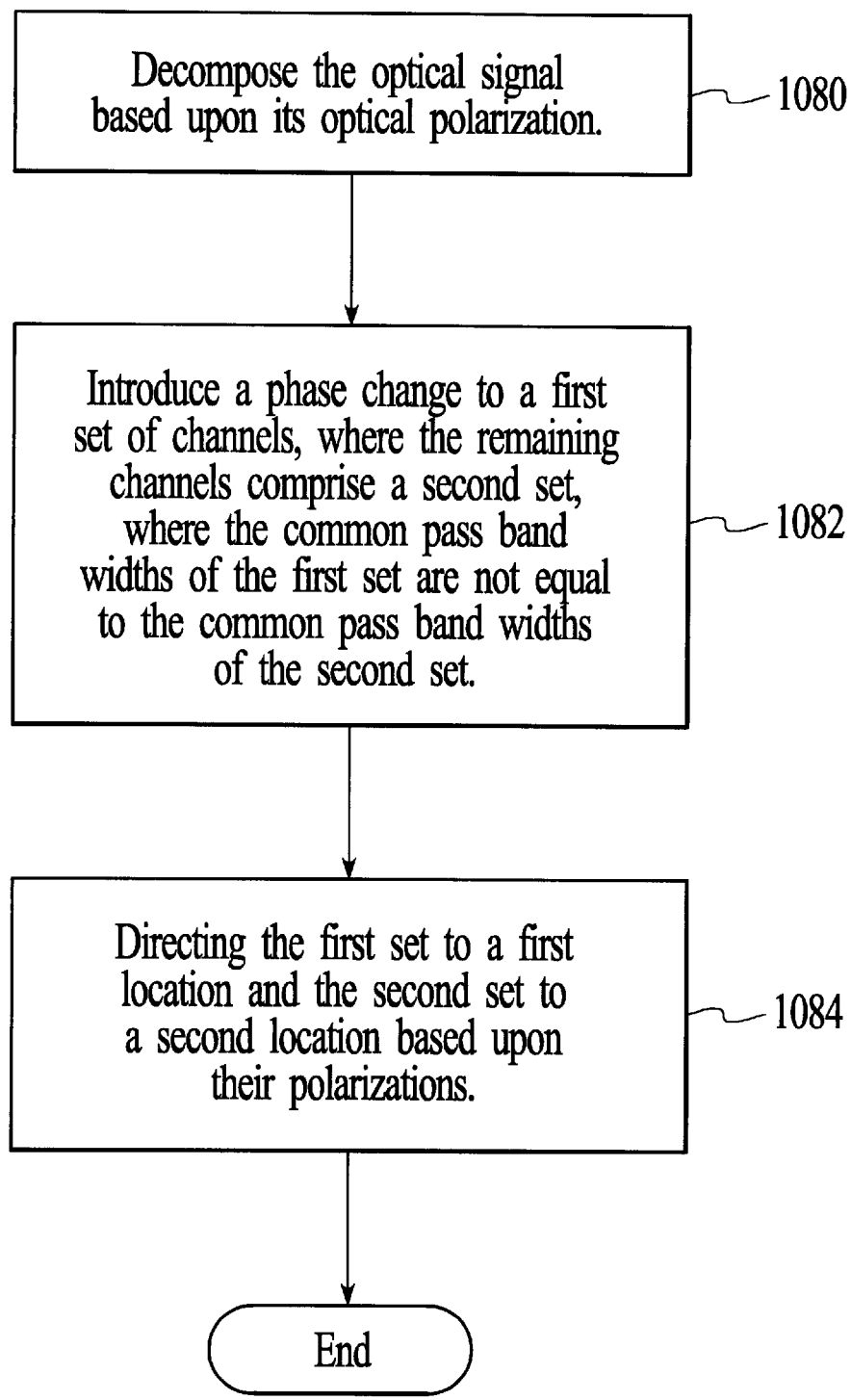
FIG. 10 is a flow chart illustrating a preferred embodiment of a method for separating channels in an optical signal, utilizing the asymmetric pass band interferometer, in accordance with the present invention.

FIG. 10 is a flow chart illustrating a preferred embodiment of a method for separating channels in an optical signal, utilizing the asymmetric pass band interferometer, in accordance with the present invention. First, the optical signal is decomposed based upon its optical polarization, via step 1080. In the preferred embodiment, the decomposition is performed by the polarization beam splitter 1070 (FIG. 4). Next, a phase change is introduced to a first set of channels of the decomposed optical signal, where the remaining channels of the decomposed optical signal comprise a second set of channels, wherein the common pass band widths of the first set are not equal to the common pass band widths of the second set, via step 1082. In the preferred embodiment, this phase change is introduced by the asymmetric pass band interferometers 300A and 300B (FIG. 3), as described above.

Then, the first set of channels is directed to a first location, while the second set of channels is directed to a second location, based upon their polarizations, via step 1084. In the preferred embodiment, the polarization beam splitter 1070 directs the channels based upon their polarizations either to output fiber 1020 or output fiber 1030, as described above.

Figure 11A:
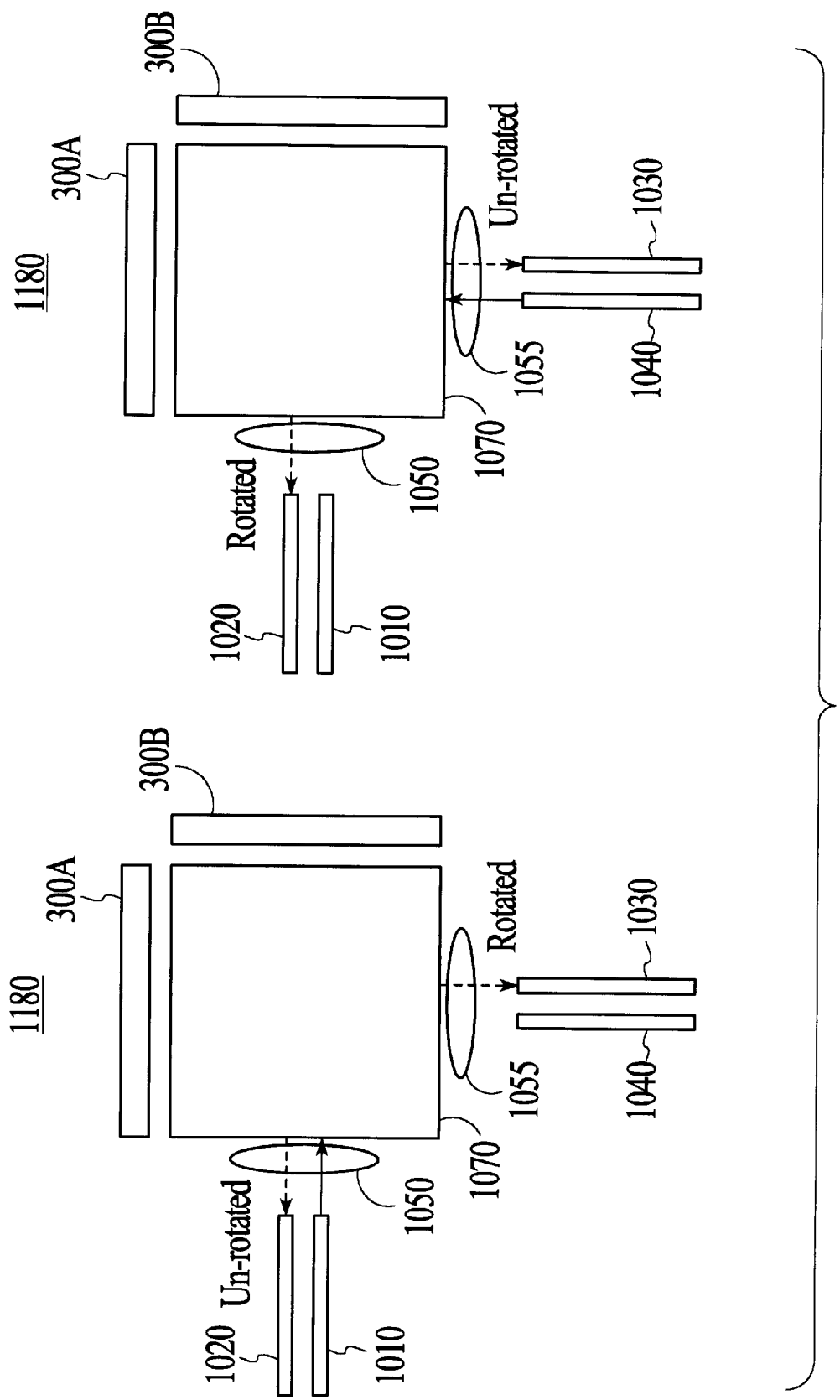
FIG. 11A illustrates a second preferred embodiment of a separator which may use the interferometer of the present invention.

Another added functionality of the asymmetric pass band interferometer 300 of the present invention is the ability to facilitate an add/drop function while also separating the channels. FIG. 11A illustrates a second preferred embodiment of a separator which may use the interferometer of the present invention. The separator 1180, or asymmetric optical add drop multiplexer (asymmetric OADM), is similar to the separator 1000 (FIG. 4) except that an additional input fiber 1040 is disposed adjacent to the output fiber 1030. Therefore, the asymmetric OADM 1180 comprises two input fibers 1010 and 1040 and two output fibers 1020 and 1030. As illustrated on the left side of FIG. 11A, when signal light is inputted to the asymmetric OADM 1180 from fiber 1010, the channels comprising wavelengths such that the light polarization planes are rotated by 90° are outputted from fiber 1030 and the channels comprising wavelengths such that the light polarization planes are not rotated are outputted from fiber 1020. Conversely, as illustrated on the right side of FIG. 11A, when signal light is inputted to the asymmetric OADM 1180 from fiber 1040, the channels comprising wavelengths such that the light polarization planes are rotated by 90° are outputted from fiber 1020 and the channels comprising wavelengths such that the light polarization planes are not rotated are outputted from fiber 1030. Thus, the output fiber 1020 carries light from fiber 1010 of wavelengths such that the polarization planes are not rotated together with light from fiber 1040 of wavelengths such that the polarization planes are rotated by 90°. Furthermore, the output fiber 1030 carries light from fiber 1010 of wavelengths such that the polarization planes are rotated by 90° together with light from fiber 1040 of wavelengths such that the polarization planes are not rotated. According to the operation of the asymmetric band pass interferometers 300A, 300B of which the asymmetric OADM 1180 is comprised, the light comprising wavelengths such that the polarization plane is rotated by 90° comprises a first set of channels and the light comprising wavelengths such that the polarization plane is not rotated comprises a second set of channels wherein the first and second channels comprise mutually exclusive interleaved sets of wavelengths.

Figure 11B:
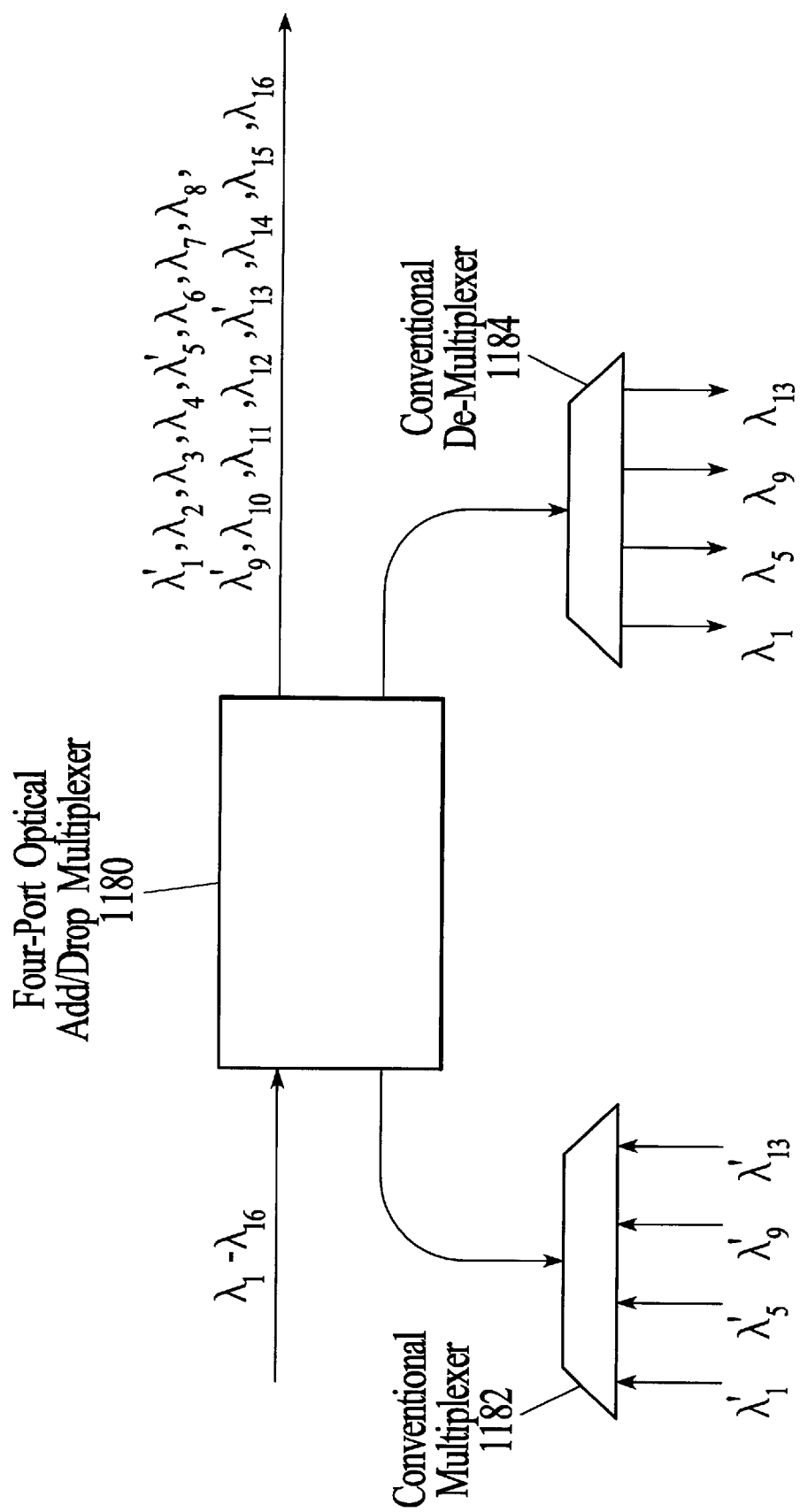
FIG. 11B is a simple block diagram of the operation of an asymmetric four-port optical add/drop multiplexer in accordance with the present invention.

FIG. 11B is a simple block diagram of the operation an asymmetric four-port optical add/drop multiplexer 1180. The add/drop multiplexer 1180 uses the interferometer 300 of the present invention (not shown) to separate channels to be dropped and added. As illustrated, a composite signal containing conventional channels $\lambda_1$–$\lambda_n$ is input into the add/drop multiplexer 1180. Device 1180 then could drop one set of channels from the input composite signal while adding another set of channels to the output signal.

For example, assume that every fourth channel is to be added and dropped. The channels to be added ($\lambda'_1$, $\lambda'_5$, $\lambda'_9$, $\lambda'_{13}$) are introduced to the add/drop multiplexer 1180 through a conventional multiplexer 1182. The add/drop multiplexer 1180 uses an interferometer 300 of the present invention with $r_1=32.5\%$, $L_1=3\lambda/16$, and $L_2=\lambda/8$, as illustrated in FIG. 8. The asymmetric OADM 1180 utilizing asymmetric pass band interferometers 300 with these optical parameters separates the input signal $\lambda_1$–$\lambda_{16}$ into a set of every three channels ($\lambda_2$, $\lambda_3$, $\lambda_4$, $\lambda_6$, $\lambda_7$, $\lambda_8$, $\lambda_{10}$, $\lambda_{11}$, $\lambda_{12}$, $\lambda_{14}$, $\lambda_{15}$, $\lambda_{16}$) and a set of the remaining channels ($\lambda_1$, $\lambda_5$, $\lambda_9$, $\lambda_{13}$). The add/drop multiplexer 1180 simultaneously adds a set of channels ($\lambda'_1$, $\lambda'_5$, $\lambda'_9$, $\lambda'_{13}$) from multiplexer 1102 while simultaneously dropping the set of the remaining channels ($\lambda_1$, $\lambda_5$, $\lambda_9$, $\lambda_{13}$). The output signal then contains the set of every three channels and the added channels ($\lambda'_1$, $\lambda_2$, $\lambda_3$, $\lambda_4$, $\lambda'_5$, $\lambda_6$, $\lambda_7$, $\lambda_8$, $\lambda'_9$, $\lambda_{10}$, $\lambda_{11}$, $\lambda_{12}$, $\lambda'_{13}$, $\lambda_{14}$, $\lambda_{15}$, $\lambda_{16}$). The dropped set of channels ($\lambda_1$, $\lambda_5$, $\lambda_9$, $\lambda_{13}$) may be de-multiplexed by a conventional de-multiplexer 1184.

Figure 12:
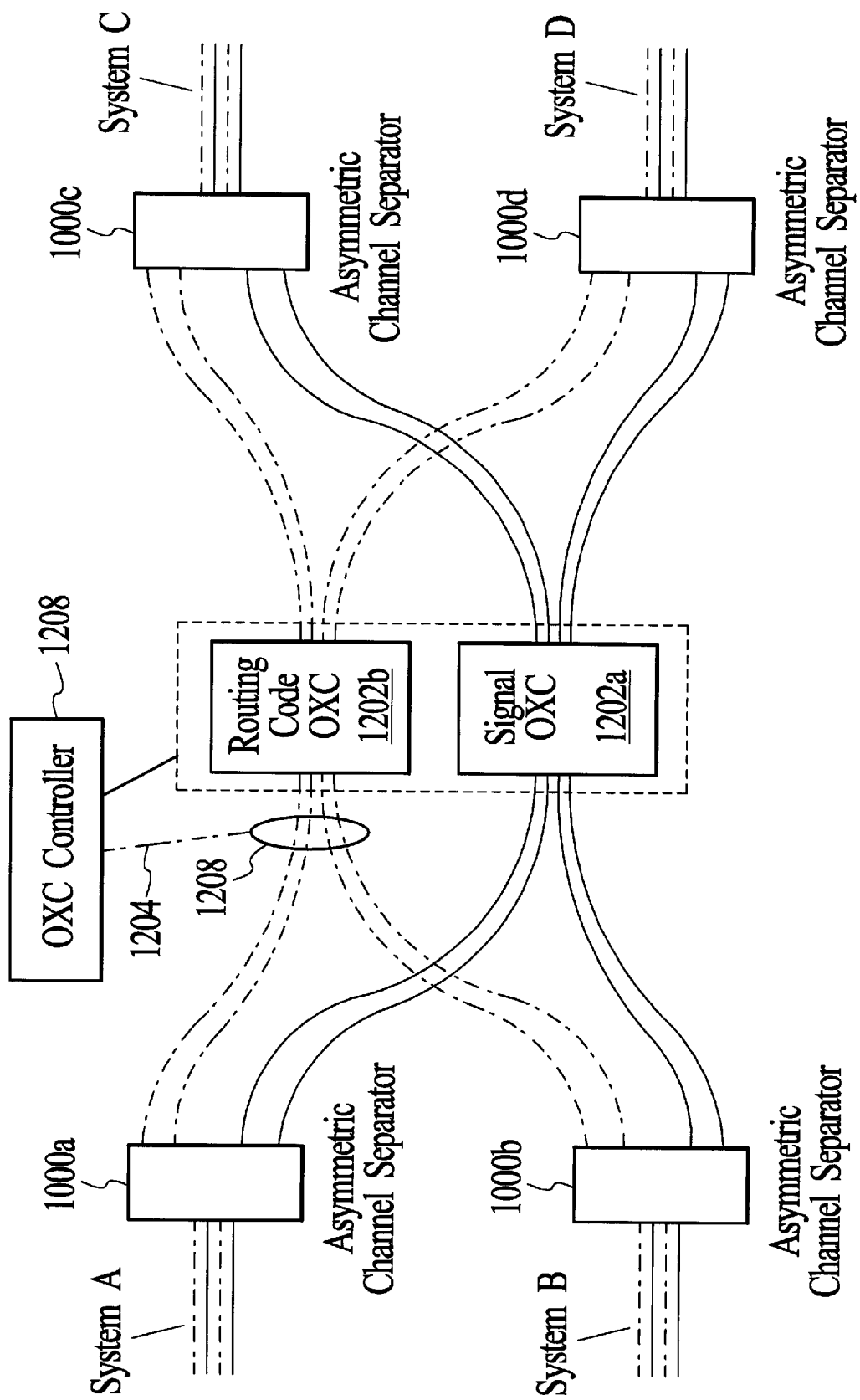
FIG. 12 illustrates a first preferred embodiment of a network which utilizes the asymmetric band pass channel separators in accordance with the present invention.

FIG. 12 illustrates a first preferred embodiment of a network which utilizes the asymmetric band pass channel separators in accordance with the present invention. In the network, a first set of optical channels comprises signals, and a second set of channels comprises signal routing information, where the first set and the second set are wavelength multiplexed together in an interleaved fashion. In the network illustrated in FIG. 12, asymmetric band pass channel separators of the present invention are utilized at network node points to separate and recombine the first and second sets of channels. For instance, referring to FIG. 9, the channel set 902, comprising wide pass bands, might carry conventional signals and the channel set 904, comprising narrow pass bands, might carry routing or destination codes, wherein each such routing code corresponds to the ultimate destination of an adjacent signal channel. In the example shown in FIG. 12, the paths of the signal carrying channels are illustrated with solid lines and the paths of the signal routing or destination channels are illustrated with dash-dot lines. Input optical communications systems or fibers, System A and System B, each transmit a plurality of such interleaved signal and routing channels to a respective asymmetric channel separator 1000 (FIG. 4) of the present invention, shown in FIG. 12 as channel separator 1000a and 1000b respectively. Each asymmetric band pass channel separator divides the signal channels from the routing channels and directs these to a first 1202a and a second 1202b optical cross connect (OXC), respectively. Optical cross connects, which are known in the art, divide, re-route and re-combine optical signals amongst various communications systems or fibers according to signals' destinations. The two OXC's 1202a and 1202b, shown in FIG. 12, which may be of any type, operate simultaneously and in parallel with one another except that the first OXC 1202a acts upon signal channels and the second OXC 1202b acts upon routing channels.

A small proportion of the routing signals are branched off to an OXC controller 1208 via an optical tap 1206 and a branch optical line 1204. The OXC controller 1208 continuously monitors and de-codes the various destination signals carried by the plurality of routing channels and controls the switching functions of the first 1202a and second 1202b OXC based upon the de-coded destinations of each and every signal. Since the routing for each destination channel through the second OXC 1202b is identical to that for the matching signal channel through the first OXC 1202a, the OXC controller 1208 controls the two OXC's 1202a, 1202b simultaneously and in parallel. After passing through the OXC's 1202a, 1202b, the signal channels and their respective matching destination channels are recombined, together with other signal/destination channel pairs, by asymmetric channel separators 1000c and 1000d so as to be output to fiber communications system, System C and System D.

Figure 13:
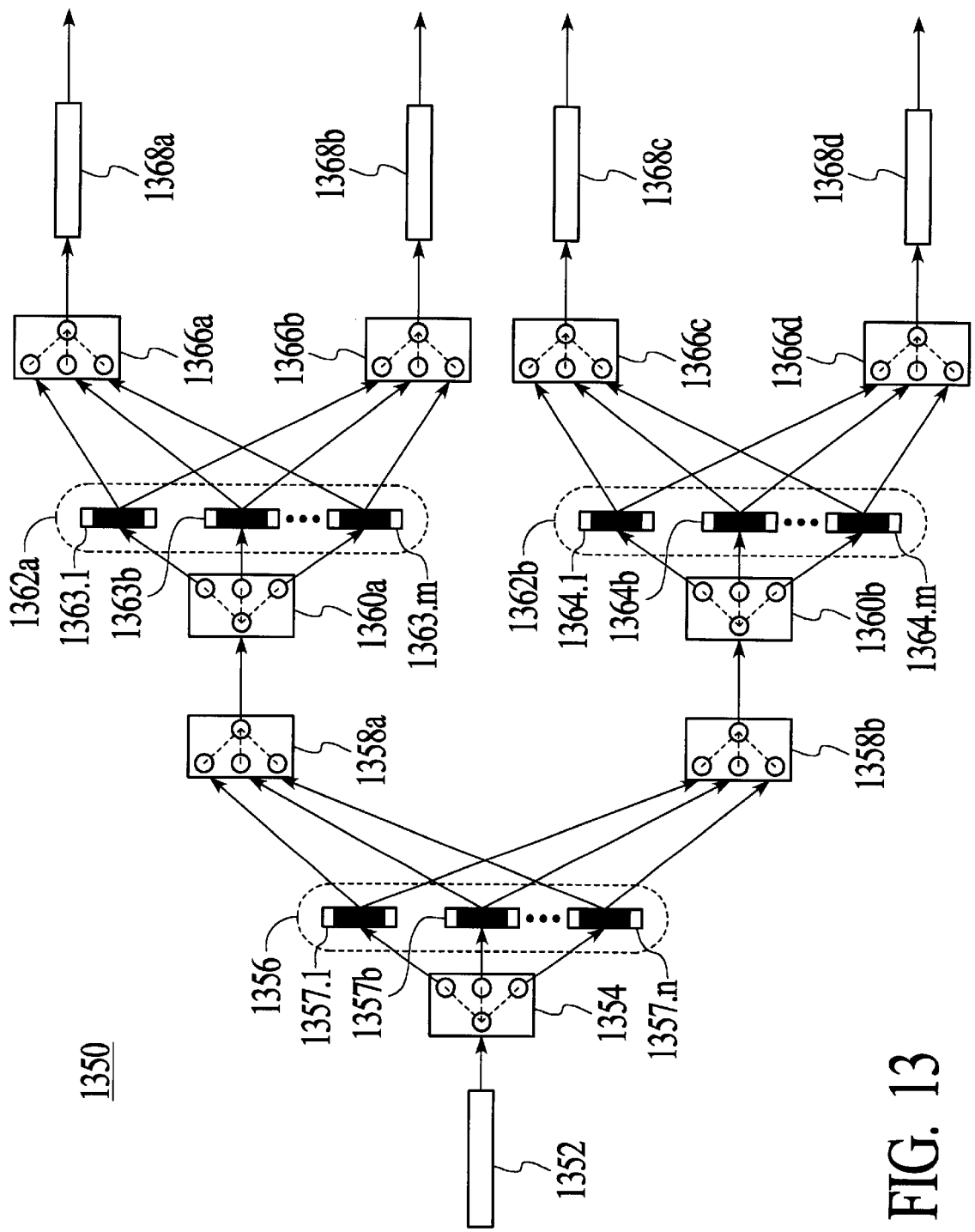
FIG. 13 illustrates an asymmetric interleaf dense wavelength division multiplexer of the present invention created by coupling the asymmetric channel separators of the present invention in a multi-stage parallel cascade arrangement.

FIG. 13 illustrates an asymmetric interleaf dense wavelength division multiplexer (AI-DWDM) created by coupling the asymmetric channel separators (ACS's) of the present invention in a multi-stage parallel cascade arrangement. In FIG. 13, a two-stage parallel cascade arrangement is shown by which a plurality of wavelength-multiplexed channels are de-multiplexed into four separate groups wherein each group is carried along a separate output fiber. However, an AI-DWDM of the type shown may be simply extended to any number of stages so as to output a greater numbers of channel groups.

As shown in FIG. 13, the AI-DWDM 1350 comprises an input fiber 1352, a first-stage 1×N path-distribution optical switch 1354, a first-stage group 1356 of n ACS's comprising the n individual channel separators 1357.1–1357.n, a first 1358a and a second 1358b first-stage N×1 path-recombining optical switch, a first 1360a and a second 1360b second-stage 1×M path distribution optical switch, a first group 1362a of m second-stage ACS's comprising the individual channel separators 1363.1–1363.m, a second group 1362b of m second-stage ACS's comprising the individual channel separators 1364.1–1364.m, a set of four second-stage M×1 path-recombining optical switches 1366a–1366d, and a set of four output optical fibers 1368a–1368d.

The AI-DWDM 1350 receives a plurality of wavelength multiplexed channels from the input fiber 1352. These channels are then directed to the first-stage path-distribution 1×N optical switch 1354 that directs the plurality of channels to exactly one of a group 1356, of n first-stage ACS's of the present invention. The group 1356 comprises one asymmetric channel separator of each type, that is, wherein the separation is according to a certain $w_1{:}w_2$ ratio as defined in FIGS. 7–9. The first-stage path-distribution 1×N optical switch 1354 selects only one channel separator at a time, that is, one of the ACS's 1357.1–1357.n, from the group 1356 of ACS's to receive the plurality of channels. A switch controller (not shown) automatically and continuously determines which channel separator actually receives the signal depending upon the instantaneous configuration of channel widths or channel groupings within the signal.

In the AI-DWDM 1350, the active first-stage asymmetric channel separator (that is, the particular ACS being utilized at any given time) divides the original plurality of channels into two subsets of channels wherein the first such subset is directed to the first 1358a and the second 1358b first-stage path-recombining switch, respectively. The number of channels directed into each such subset depends upon the channel separation properties of the active first stage ACS, as illustrated in FIGS. 7–9. The disparate pathways of each possible first subset of channels and of each possible second subset of channels are recombined by the first 1358a and the second 1358b first-stage N×1 path-recombining optical switch, respectively. The settings of the first-stage 1×N path-distribution optical switch 1354 and of the first 1358a and the second 1358b first-stage N×1 path-recombining optical switches are identical at any one time.

Subsequent to passing through one of the first-stage path-recombining switches in the AI-DWDM 1350, the first channel subset and second channel subset are directed, respectively, to the first 1360a and the second 1360b second-stage 1×M path distribution optical switch wherein each of said switches directs the respective channel subset to exactly one of a group of second-stage asymmetric channel separators. The first and second channel subset are directed to one separator of the group 1362a and of the group 1362b, respectively. The switch controller automatically and continuously determines which second-stage channel separator actually receives the signal depending upon the instantaneous configuration of channel widths within the first and second channel subsets. By passing through the sequence of switches, either through the switch 1358a followed by the switch 1360a or else through the switch 1358b followed by the switch 1360b, the active first-stage and second-stage channel separators need not be of the same type during the operation of the AI-DWDM 1350.

Upon passing through one of the first group of second-stage asymmetric channel separators, that is, through one of the ACS's 1363.1–1363.m in AI-DWDM 1350, the first subset of channels is divided into a third and a fourth subset of channels. Likewise, upon passing through one of the second group of second-stage asymmetric channel separators, that is, through one of the ACS's 1364.1–1364.m in AI-DWDM 1350, the second subset of channels is divided into a fifth and a sixth subset of channels. The number and identity of channels directed into each such subset depend upon the channel separation properties of the active first stage and active second stage ACS, as illustrated in FIGS. 7–9. The third, fourth, fifth and sixth channel subsets are then directed to second-stage path-recombination M×1 optical switch 1366*a*, 1366*b*, 1366*c* and 1366*d*, respectively, in asymmetric DWDM 1350, At any one time, the setting of the first second-stage path-distribution switch 1360*a* is identical to that of each of the second-stage path-recombination switches 1366*a* and 1366*b* and the setting of the second second-stage path-distribution switch 1360*b* is identical to that of each of the second-stage path-recombination switches 1366*c* and 1366*d*. After passing through its respective switch, each of the third, fourth, fifth and sixth channel subsets is directed to a single output optical fiber 1368*a*–1368*d*.

Figure 14:
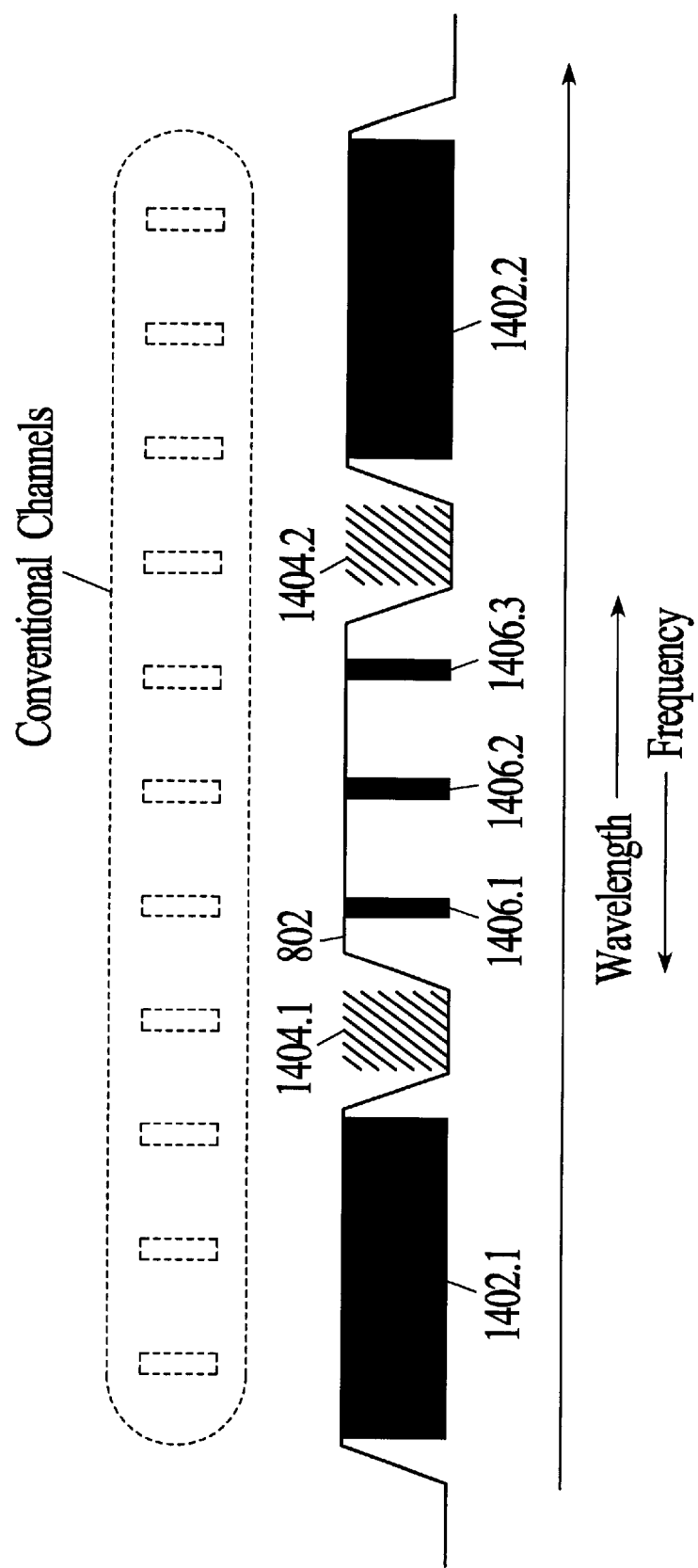
FIG. 14 illustrates a preferred embodiment of a wavelength multiplexed channel configuration for use in an optical network utilizing an asymmetric interleaf dense wavelength division multiplexer in accordance with the present invention.

FIG. 14 illustrates a preferred embodiment of a wavelength multiplexed channel configuration for use in an optical network utilizing an asymmetric interleaf dense wavelength division multiplexer in accordance with the present invention. Dashed lines in FIG. 14 schematically illustrate a system of conventional channels having uniform channel spacing and bandwidths. The novel channel configuration disclosed herein, which is illustrated in solid lines and shaded rectangles, comprises a first set of i broadband channels 1402.1–1402.*i* multiplexed together with a second set of j intermediate bandwidth channels 1404.1–1404.*j* as well as a third set of k narrow band channels 1406.1–1406.*k* (i, j and k are integers greater than 1), wherein the data transfer rate or bandwidth of each channel of the first such set is approximately four times that of each channel of the second such set, and the data transfer rate or bandwidth of each channel of the second such set is approximately four times that of each channel of the third such set. In FIG. 14, two individual channels 1402.1–1402.2 of the first (broadband) set, two individual channels 1404.1–1404.2 of the second (intermediate bandwidth) set and three individual channels 1406.1–1406.3 of the third (narrow band) set are illustrated. However, as further described below, the inventive channel configuration comprises an indefinite number of channels of each such set.

As further shown in FIG. 14, the central wavelength position of each channel of the novel channel configuration corresponds to that of a conventional channel, wherein the center-to-center inter-channel spacing of channels of the first 1402 (broadband), second 1404 (intermediate bandwidth) and third 1406 (narrow band) set is equivalent to the separation between every eighth, every fourth, and each conventional channel, respectively. Furthermore, a channel 1402.1 of the first set is followed in wavelength (or frequency) by a channel 1404.1 of the second set, the channel 1404.1 of the second set is further followed in wavelength (or frequency) by at least one and up to three channels 1406.1–1406.3 of the third set, and the channels 1406.1–1406.3 of the third set are further followed in wavelength (or frequency) by a second channel 1404.2 of the second set. For instance, in FIG. 14, such a sequence of channels is illustrated by the sequence of channels 1402.1, 1404.1, 1406.1, 1406.2, 1406.3, and 1404.2 and is also illustrated by the sequence of channels 1402.2, 1404.2, 1406.3, 1406.2, 1406.1, and 1404.1. This sequence of channels comprises one period that is repeated in wavelength (or frequency) an indefinite number of times so as to produce a periodic channel configuration.

Figure 15:
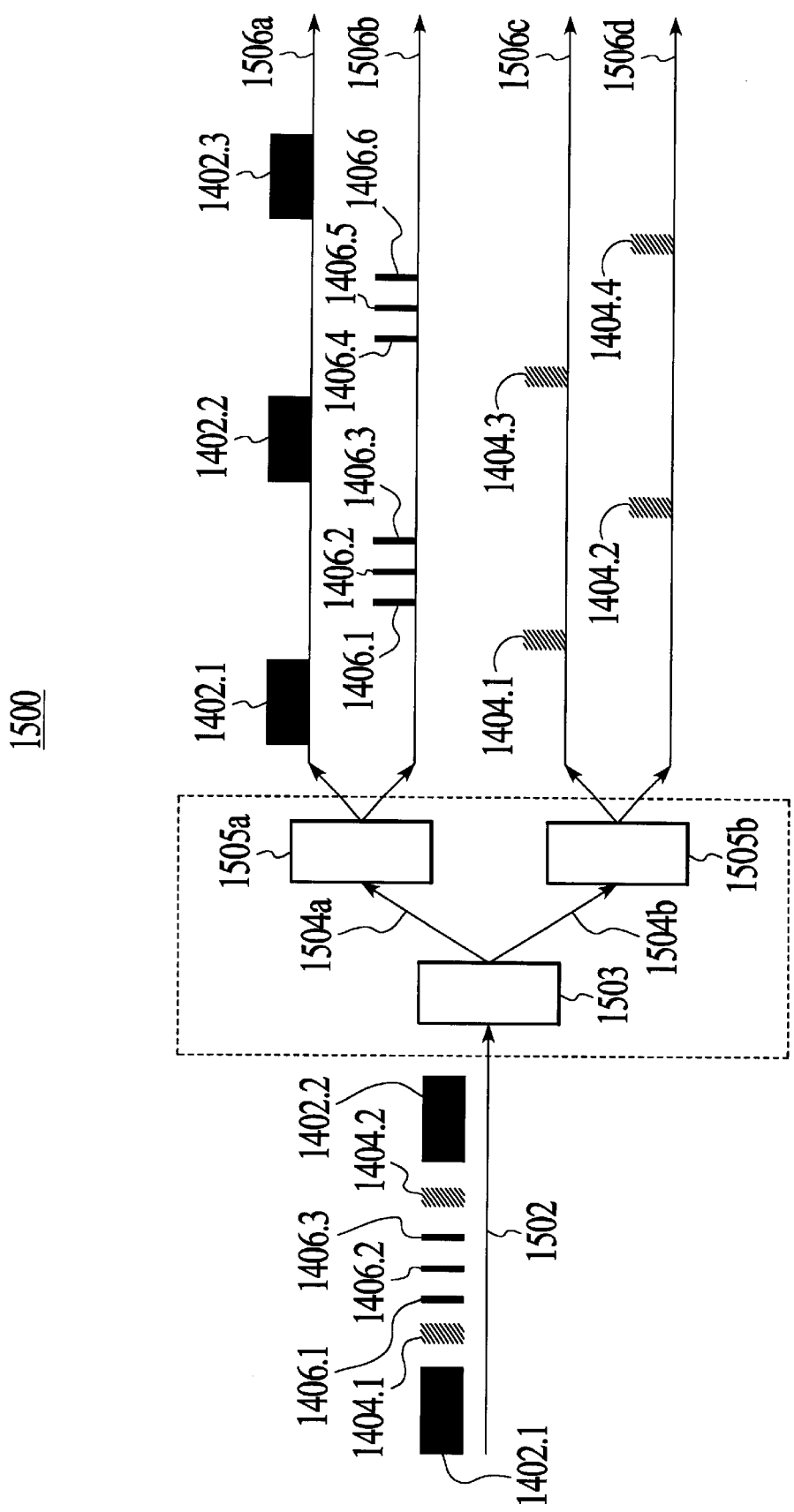
FIG. 15 illustrates a preferred embodiment of a method for de-multiplexing the channels of the configuration illustrated in FIG. 14 utilizing an asymmetric interleaf dense wavelength division multiplexer in accordance with the present invention.

FIG. 15 illustrates a preferred embodiment of a method for de-multiplexing the channels of the configuration illustrated in FIG. 14 utilizing an asymmetric interleaf dense wavelength division multiplexer (AI-DWDM) in accordance with the present invention. The AI-DWDM 1500 is comprised of a first channel separator 1503 utilizing asymmetric pass band interferometers and a further pair of second channel separators 1505*a*–1505*b*, wherein the first channel separator 1503 is optically coupled to the second channel separators 1505*a*–1505*b* in a parallel cascade configuration. The first channel separator 1503 is comprised of asymmetric pass band interferometers such that conventional channels are or would be separated according to a 3-to-1 scheme as illustrated by the pass band sets (transmission spectra) of FIG. 8. One such transmission spectrum 802 is shown in FIG. 14. The positions of channels of the first set 1402.1–1402.*i* and of the third set 1406.1–1406.*k* coincide with the pass bands of the spectrum 802. Likewise the positions of channels of the second set 1404.1–1404.*j* coincide with isolation bands of the spectrum 802 or else pass bands of the spectrum 804 (not shown in FIG. 14). The second channel separators 1505*a*–1505*b* have symmetric, uniform-width pass bands such that light comprising every second such band, wherein the band is comprised of one or more individual channels, is directed to one or another of the output ports of the channel separator.

FIG. 15 schematically illustrates several channels disposed according to the inventive channel configuration outlined in FIG. 14. These channels are de-multiplexed in two stages by the AI-DWDM 1500. In the first stage, the first channel separator 1503 directs channels of the first set 1402.1–1402.*i* and channels of the third set 1406.1–1406.*k* to first optical path 1504*a* whilst it simultaneously directs channels of the second set 1404.1–1404.*j* along second optical path 1504*b*. The first 1504*a* and second 1504*b* optical paths direct channels to the separator 1505*a* and the separator 1505*b*, respectively. The separator 1505*a* separates channels of the first set 1402.1–1402.*i* from those of the third set 1406.1–1406.*k* and directs these channels to output fiber 1506*a* and output fiber 1506*b*, respectively. The separator 1505*b* separates channels of the second channel set such that every second channel of set 1404.1 –1404.*j* is directed to output fiber 1506*c* and the remaining channels are directed to output fiber 1506*d*. Thus, after passing through the AI-DWDM 1500, the output fiber 1506*a* carries all and only those channels of the first set of channels 1402.1–1402.*i*, the second output fiber carries all and only those channels of the third set of channels 1406.1 –1406.*k*, the third output fiber 1506*c* carries only every second channel 1404.1, 1404.3, 1404.5, etc. of the second set of channels, and the output fiber 1506*d* carries only the remaining channels 1404.1, 1404.3, 1404.5, etc. of the second set of channels.

An improved separation mechanism to be used in a dense wavelength division multiplexer has been disclosed. The preferred embodiment of the separation mechanism comprises an asymmetric pass band interferometer which is capable of separating channels from signals with different bandwidths or of separating conventional bandwidth channels into uneven asymmetric groupings. With the present invention, a maximum use of available bandwidth on an optical fiber may be accomplished. An added functionality of the asymmetric pass band interferometer of the present invention is the ability to facilitate an add/drop function while also separating the channels.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An interferometer, comprising:
   a first glass plate optically coupled to a second glass plate, forming a space therebetween;
   a first reflective coating with a first reflectivity residing inside the space and on the first glass plate;
   a second reflective coating with a second reflectivity residing inside the space and on the second glass plate;
   a first waveplate with a first optical retardance residing inside the space; and
   a second waveplate with a second optical retardance, optically coupled to the first glass plate and residing outside the space, wherein a combination of values for the first reflectivity, the first optical retardance, and the second optical retardance effects a separation of channels in at least one optical signal into at least two sets, wherein the at least two sets have asymmetrically interleaved pass bands.

2. The interferometer of claim 1, wherein channels from a plurality of optical signals may be separated, wherein at least two of the plurality of optical signals have different data transfer rates.

3. The interferometer of claim 1, wherein the second reflectivity is approximately 100%.

4. The interferometer of claim 1, further comprising:
   a plurality of zero-expansion support members coupled between the first and second glass plates.

5. A dense wavelength division multiplexer (DWDM) for separating an optical signal into optical channels, comprising:
   a polarization beam splitter; and
   a plurality of interferometers optically coupled to the polarization beam splitter, wherein the polarization beam splitter and the plurality of interferometers allow for a separation of the optical signal into at least two sets of optical channels, the at least two sets having asymmetrically interleaved pass bands.

6. The DWDM of claim 5, wherein each of the plurality of interferometers comprises:
   a first glass plate optically coupled to a second glass plate, forming a space therebetween, the first glass plate optically coupled to the polarization beam splitter;
   a first reflective coating with a first reflectivity residing inside the space and on the first glass plate;
   a second reflective coating with a second reflectivity residing inside the space and on the second glass plate;
   a first waveplate with a first optical retardance residing inside the space; and
   a second waveplate with a second optical retardance, optically coupled to the first glass plate and residing outside the space, wherein a combination of values for the first reflectivity, the first optical retardance, and the second optical retardance effect the separation of channels into the at least two sets.

7. The DWDM of claim 5, wherein channels from a plurality of optical signals may be separated, wherein at least two of the plurality of optical signals have different data transfer rates.

8. The DWDM of claim 6, wherein the second reflectivity is approximately 100%.

9. The DWDM of claim 6, wherein each of the plurality of interferometers further comprises:
   a plurality of zero-expansion support members coupled between the first and second glass plates.

10. A system, comprising:
    a plurality of optical fibers for carrying an optical signal or a portion thereof; and
    a dense wavelength division multiplexer comprising a plurality of separators, each separator comprising:
       a polarization beam splitter, and
       a plurality of interferometers optically coupled to the polarization beam splitter, wherein the polarization beam splitter and the plurality of interferometers allow for a separation of the optical signal into at least two sets of optical channels, the at least two sets having asymmetrically interleaved pass bands.

11. The system of claim 10, wherein each of the plurality of interferometers comprises:
    a first glass plate optically coupled to a second glass plate, forming a space therebetween, the first glass plate optically coupled to the polarization beam splitter;
    a first reflective coating with a first reflectivity residing inside the space and on the first glass plate;
    a second reflective coating with a second reflectivity residing inside the space and on the second glass plate;
    a first waveplate with a first optical retardance residing inside the space; and
    a second waveplate with a second optical retardance, optically coupled to the first glass plate and residing outside the space, wherein a combination of values for the first reflectivity, the first optical retardance, and the second optical retardance effect for the separation of channels into the at least two sets.

12. A system, comprising:
    a plurality of optical fibers for carrying an optical signal or a portion thereof; and
    an add/drop multiplexer, comprising an interferometer, the interferometer allowing for a separation of a first set of channels of the optical signal to be dropped from a second set of remaining channels of the optical signal, wherein the first and second sets have asymmetrically interleaved pass bands.

13. The system of claim 12, wherein the interferometer comprises:
    a first glass plate optically coupled to a second glass plate, forming a space therebetween, the first glass plate optically coupled to the polarization beam splitter;
    a first reflective coating with a first reflectivity residing inside the space and on the first glass plate;
    a second reflective coating with a second reflectivity residing inside the space and on the second glass plate;
    a first waveplate with a first optical retardance residing inside the space; and
    a second waveplate with a second optical retardance, optically coupled to the first glass plate and residing outside the space, wherein a combination of values for the first reflectivity, the first optical retardance, and the second optical retardance effect the separation of channels into the first and second sets.

14. A method for separating an optical signal into optical channels, comprising the steps of:
    (a) decomposing the optical signal based upon its polarization;
    (b) introducing a phase change to a first set of channels of the decomposed optical signal, where the remaining channels of the decomposed optical signal comprise a second set, wherein the first and second sets have asymmetrically interleaved pass bands; and (c) directing the first set to a first location and the second set to a second location based upon the introduced phase change.

15. The method of claim 14, wherein the decomposing step (a) and the directing step (c) are performed by a polarization beam splitter.

16. The method of claim 14, wherein the introducing step (b) is performed by a plurality of interferometers, each of the interferometers comprising:

a first glass plate optically coupled to a second glass plate, forming a space therebetween;

a first reflective coating with a first reflectivity residing inside the space and on the first glass plate;

a second reflective coating with a second reflectivity residing inside the space and on the second glass plate;

a first waveplate with a first optical retardance residing inside the space; and a second waveplate with a second optical retardance, optically coupled to the first glass plate and residing outside the space, wherein a combination of values for the first reflectivity, the first optical retardance, and the second optical retardance facilitate asymmetric pass bands for the first and second sets.

17. A system for separating an optical signal into optical channels, comprising:

a plurality of optical fibers for carrying the optical signal or a portion thereof; and a dense wavelength division multiplexer coupled to the plurality of optical fibers, comprising:

a plurality of separators at least partly arranged in a multi-stage parallel cascade configuration, each separator comprising:

first glass plate optically coupled to a second glass plate, forming a space therebetween;

a first reflective coating with a first reflectivity residing inside the space and on the first glass plate;

a second reflective coating with a second reflectivity residing inside the space and on the second glass plate;

a first waveplate with a first optical retardance residing inside the space; and a second waveplate with a second optical retardance, optically coupled to the first glass plate and residing outside the space, wherein a combination of values for the first reflectivity, the first optical retardance, and the second optical retardance effects a separation of channels in an optical signal into at least two sets, wherein the at least two sets have asymmetrically interleaved pass bands; and a plurality of optical switches coupled to the plurality of separators for directing the optical signal or a portion thereof to an appropriate separator of the plurality of separators.

18. A method for separating an optical signal into optical channels, comprising:

(a) inputting the optical signal, the optical signal comprising a plurality of optical channels;

(b) separating one or more of the plurality of optical channels into at least two sets using a plurality of separators, wherein the at least two sets have asymmetrically interleaved pass bands, wherein the separators are at least partly arranged in a multi-stage parallel cascade configuration with at least one separator at each stage, wherein at each stage, the plurality of optical channels or a portion thereof are directed to an appropriate separator of the stage; and (c) outputting the at least two sets along a plurality of optical paths.

19. A system, comprising:

a first plurality of dense wavelength division multiplexers (DWDM) for receiving a plurality of channels, wherein the first plurality of DWDM separates the plurality of channels into a first set of channels comprising a plurality of signals and a second set of channels comprising signal routing information;

an optical cross connect (OXC) controller optically coupled to the first plurality of DWDM for receiving the first and second sets of channels, wherein the OXC controller comprises a first OXC and a second OXC, and wherein the first OXC receives the first set of channels and the second OXC receives the second set of channels; and a second plurality of DWDM optically coupled to the OXC controller for receiving the first and second sets of channels, wherein the first and second sets of channels are routed to an appropriate DWDM of the second plurality of DWDM by the OXC controller based upon information in the second set of channels, and wherein each of the first and second plurality of DWDM comprises a plurality of separators, each of the plurality of separators comprising:

a polarization beam splitter; and a plurality of interferometers optically coupled to the polarization beam splitter, wherein the polarization beam splitter and the plurality of interferometers allow for a separation of the optical signal into at least two sets of optical channels, the at least two sets having asymmetrically interleaved pass bands.

20. The system of claim 19 wherein each of the plurality of interferometers comprises a first glass plate optically coupled to a second glass plate, forming a space therebetween;

a first reflective coating with a first reflectivity residing inside the space and on the first glass plate;

a second reflective coating with a second reflectivity residing inside the space and on the second glass plate;

a first waveplate with a first optical retardance residing inside the space; and a second waveplate with a second optical retardance, optically coupled to the first glass plate and residing outside the space, wherein a combination of values for the first reflectivity, the first optical retardance, and the second optical retardance effects a separation of channels in an optical signal into at least two sets, wherein the at least two sets have asymmetrically interleaved pass bands.

21. A method for separating an optical signal into optical channels, comprising:

(a) inputting the optical signal, the optical signal comprising a plurality of optical channels;

(b) separating one or more of the plurality of optical channels into at least two sets using a plurality of separators, wherein the at least two sets have asymmetrically interleaved pass bands, wherein the separators are at least partly arranged in a multi-stage parallel cascade configuration; and (c) outputting the at least two sets along a plurality of optical paths.

22. A system, comprising:

a plurality of optical paths, one of the plurality of optical paths for inputting an optical signal, the optical signal comprising a plurality of optical channels; and a plurality of separators optically coupled to the plurality of optical paths, wherein the plurality of separators separates one or more of the plurality of optical channels into at least two sets, wherein the at least two sets have asymmetrically interleaved pass bands, wherein the plurality of separators are at least partly arranged in a multi-stage parallel cascade configuration.

23. A system, comprising:

an optical network, comprising an asymmetric interleaf dense wavelength division multiplexer (AI-DWDM); and a plurality of channels propagating through the AI-DWDM, wherein AI-DWDM:

introduces a phase change to a first set of the plurality of channels, wherein the remaining of the plurality of channels comprise a second set, wherein the first and second sets have asymmetrically interleaved pass bands; and directing the first set to a first location in the optical network and the second set to a second location in the optical network based upon the introduced phase change.

24. A wavelength multiplexed channel configuration comprising:

a plurality of sequential sets of channels, each of the plurality of sequential sets having a channel bandwidth that is greater than a next sequential set; and a multiplexer for multiplexing the plurality of sequential sets of channels.

25. A method for transmitting a plurality of wavelength multiplexed channels along an optical communications system comprising;

a plurality of first channels with first bandwidths, a plurality of second channels with second bandwidths; and a plurality of third channels with third bandwidths, wherein the first, second and third pluralities of channels are multiplexed together, wherein the first bandwidth is greater than the second bandwidth and the second bandwidth is greater than the third bandwidth.

26. The method of claim 25 wherein first bandwidth is approximately four times the second bandwidth and the second bandwidth is approximately four times the third bandwidth.

* * * * *